Patented Mar. 3, 1936

2,032,890

UNITED STATES PATENT OFFICE 2,032,890

COMPOSITION OF MATTER

Walter Schoeller, Berlin-Westend, and Hans Goebel, Berlin-Reinickendorf, Germany, assignors to Schering-Kahlbaum A. G., Berlin, Germany No Drawing. Application November 16, 1931, Serial No. 575,462. In Germany December 8, 1930

3 Claims. (Cl. 167—76)

Our invention relates to a new composition of matter containing thyroxine, a hormone of the thyroid gland, which has also been produced synthetically and has the formula:

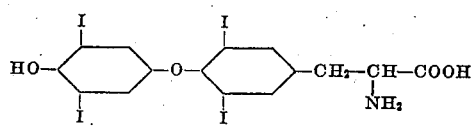

During recent years thyroxine has largely been used as a means for influencing metabolism. As a rule solutions of thyroxine have been injected, but it has also been tried to dispense it per os, for instance in the form of tablets. Here a difficulty presented itself, viz. the turbidity of thyroxine solutions prepared with tap water from the water works, which arises from the fact that the calcium salts always present in the water as well as the carbon dioxide in the air will react with the thyroxine salt, forming therewith precipitates, which not only render the solutions turbid, but also considerably reduce their efficiency.

We have now found that these undesirable properties of the thyroxine can be overcome and clearly soluble tablets containing thyroxine can be produced, if the thyroxine is mixed with hydrotropic substances, i. e. substances capable of rendering difficultly soluble or insoluble substances readily soluble. We have found that the sulfo acids of aromatic hydrocarbons as well as their derivatives, the amides of carbon dioxide, such as carbamide (urea), or the ethers of such amides, such as urethane, will favorably affect the solubility of the thyroxine. If substances, such as enumerated, are added to the mixture containing thyroxine, this mixture being then subjected to pressure to form tablets, such tablets will be readily and totally dissolved in the water from the water works, and solutions will be obtained, which remain clear and in which the thyroxine is contained in a readily resorbable form, so that not more than the calculated quantity of hormone need be present to obtain the desired effect.

The hydrotropic substances employed in my invention are highly soluble in water and substantially inert physiologically.

The term "hydrotropic" was originated in 1916 by Karl Neuberg, the eminent physiological chemist, who listed a large number of such substances in an article published in the "Biochemische Zeitschrift" 76, 107 (1916). He listed, for example, the salts of benzoic acid and of benzene sulfonic acids, the homologues and the substitution products of these acids, naphthoic acid and its derivatives, naphthalene sulfonic acids, thiophene carbonic acids, pyromucic acid, phenyl acetic acid, homologous fatty aromatic acids, etc. Other articles listing hydrotropic substances have been published by R. Wilhelmy in "Chemische Umschau fur Ole, Wachse und Harze", 36, 198–203 and 213–218, and by G. Lindau in "Naturwissenschaften", 20, 396–401 (1932).

If substances capable of developing carbon dioxide are admixed to the mixture, tablets are obtained, which dissolve in water with particular readiness.

In practising our invention we may for instance proceed as follows:—

*Example 1*

15 grams thyroxine, 15 grams sodium hydroxide (caustic soda) and 1270 grams urethane in powder form are mixed and formed into 5000 tablets.

*Example 2*

15 grams thyroxine, 15 grams caustic soda, 1050 grams urethane, 110 grams tartaric acid and 110 grams sodium carbonate are powdered, mixed and formed into 5000 tablets.

*Example 3*

15 grams thyroxine, 15 grams caustic soda and 1050 grams sodium benzoate are formed into 5000 tablets.

As indicated by the specific examples, the quantity of hydrotropic substance used is substantially greater than that of other constituents of our tablets.

Various changes may be made in the details disclosed in the foregoing specification without departing from the invention or sacrificing the advantages thereof.

We claim:

1. As an article of manufacture, an effervescing tablet quickly soluble in tap water and forming solutions remaining free from turbidity on standing in contact with air, comprising thyroxine, constituents producing the evolution of carbon dioxide upon contact with water, at least sufficient caustic alkali to render the thyroxine soluble in distilled water and a substantially larger quantity of a highly soluble hydrotropic substance selected from a group consisting of the amides of carbon dioxide and the ethers of such amides which are substantially inert physiologically.

2. As an article of manufacture, an effervescing tablet quickly soluble in tap water and forming solutions remaining free from turbidity on standing in contact with air, comprising thyroxine, constituents producing the evolution of carbon dioxide upon contact with water, at least sufficient caustic alkali to render the thyroxine soluble in distilled water, and a substantially larger quantity of urethane.

3. As an article of manufacture, an effervescing tablet quickly soluble in tap water and forming solutions remaining free from turbidity on standing in contact with air, comprising thyroxine, constituents producing the evolution of carbon dioxide upon contact with water, at least sufficient caustic alkali to render the thyroxine soluble in distilled water, and a substantially large quantity of urea.

WALTER SCHOELLER.
HANS GOEBEL.